United States Patent

Roddy et al.

[11] 3,797,837
[45] Mar. 19, 1974

[54] CHUCK WITH JAW-GUIDING-AND-SUPPORTING BORES

[75] Inventors: John J. Roddy, Meriden; Linwood B. Swanson, Newington, both of Conn.

[73] Assignee: Cushman Industries, Incorporated, Hartford, Conn.

[22] Filed: May 26, 1972

[21] Appl. No.: 257,280

[52] U.S. Cl. .................................. 279/114, 279/118
[51] Int. Cl. ............................................. B23b 5/22
[58] Field of Search ........... 279/110, 109, 119, 123, 279/114, 115, 116, 1 R, 2, 4, 111, 112, 113, 118, 117; 269/296, 252, 256

[56] References Cited
UNITED STATES PATENTS
2,409,680  10/1946  Heeter ................................. 279/2
1,356,574  10/1920  Warder ................................. 279/2
2,695,176  11/1954  Work ................................. 279/119

Primary Examiner—Andrew R. Juhasz
Assistant Examiner—W. R. Briggs
Attorney, Agent, or Firm—Walter Spruegel

[57] ABSTRACT

A chuck, having a chuck body with an axis, a front face and an outer periphery, jaws, and jaw-operating mechanism, of which the jaws are, for their support and guidance in the chuck body, provided with cylindrical bars which are received with a sliding fit in cylindrical bores in the chuck body that extend with their axes radially of and normal to the body axis, and are spaced from the front face of the body. The bores in the chuck body are open at the outer body periphery, and the bars extend beyond the outer body periphery to the outside of the body where they are joined with the jaws which extend along and spaced from the front face of the body, with the jaws also having inner post extensions which are received with a sliding fit in further radial bores in a center boss on the front face of the chuck body.

6 Claims, 3 Drawing Figures

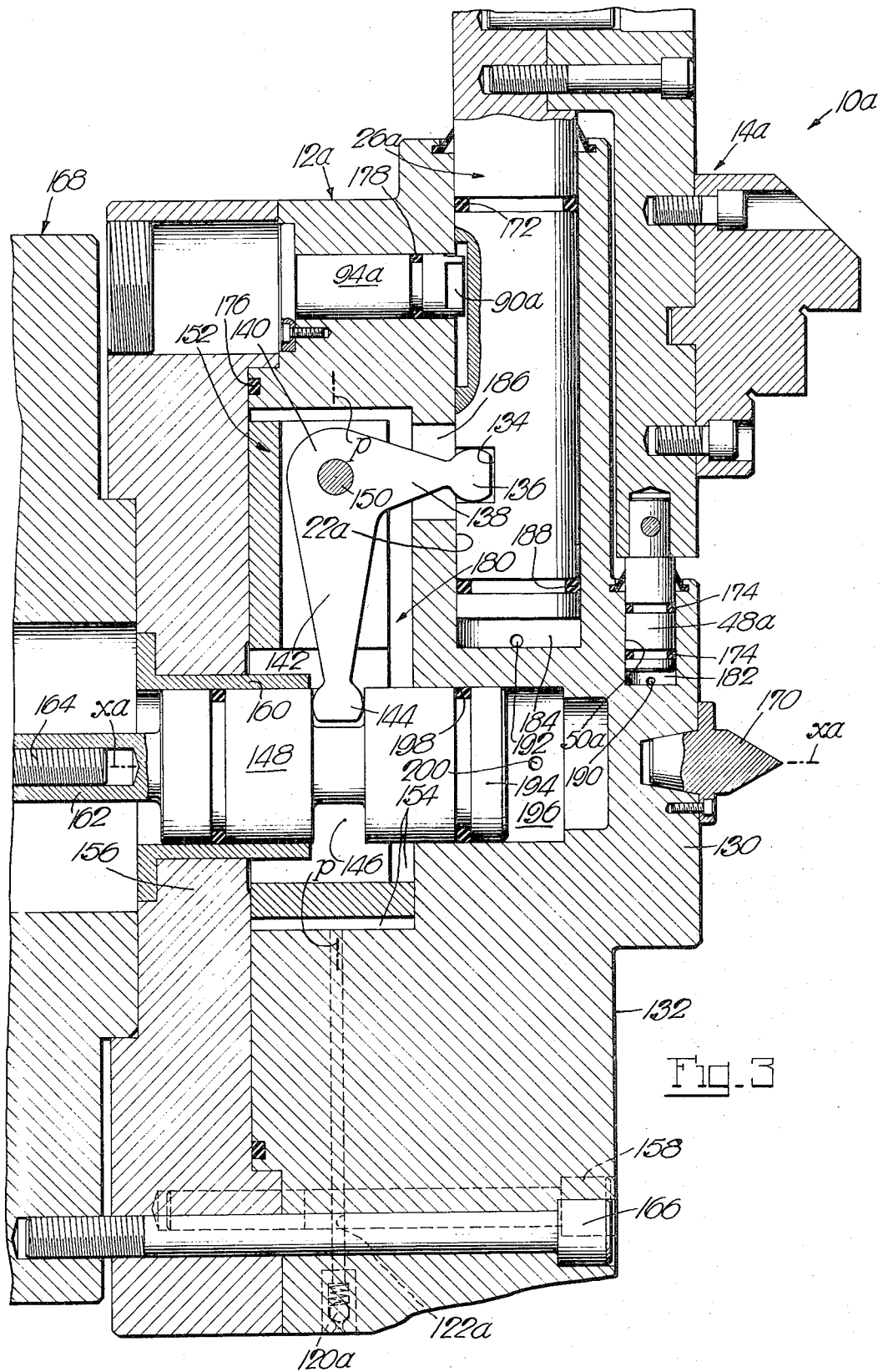

CHUCK WITH JAW-GUIDING-AND-SUPPORTING BORES

This invention relates to chucks in general, and to dust-proof chucks in particular.

The invention is concerned with the type of chucks of which the jaws are movable in radial guideways in the front of the chuck body, and have releasable operating connections with a jaw actuator or actuators within the chuck body, such as plunger-operated rockers, a wedge or a scroll, for example. Dust and other foreign matter present at many chuck operations will sooner or later find its way to the operating parts of chucks of this type and inevitably induce wear of these parts. Wear of operating chuck parts from this cause is particularly rapid and destructive in the case of some kinds of dust, such as grinding dust, for example, which accumulates and spreads all too freely everytime work is ground, and which is particularly destructive on matching surfaces of chuck parts that are carefully fitted for intended long life and accurate performance of the chucks. Thus, surrounding dust and other matter will find its way to operating parts of these chucks despite their usual closed construction for intended exclusion of chips and dirt, including dust, because these closed chucks simply fail to seal off all leakage paths to the operating parts, including the usually most accessible leakage paths along the guideways in the chuck body which, for intended longtime accurate and playless guidance of the jaws, are commonly of costly machined dovetail configuration, but because of this many-sided configuration leave inevitable leakage paths therealong and also into the interior of the chuck body, which cannot be sealed effectively, and particularly not for any length of time. These prevailing leakage paths in even closed chucks of this type are equally harmful to those chucks which, at least while in operation, are immersed in liquid, such as cooling and/or lubricating liquids, for example, which have deteriorating effects on any or all internal chuck parts.

It is among the objects of the present invention to provide chucks of this type of which all operating parts liable to wear from dust and related causes are in a structurally simple and inexpensive, built-in manner sealed from dust and similar foreign matter so that such foreign matter is for all practical purposes no longer a factor in wear of these parts, neither will liquids be a factor in deterioration of such parts in chucks which are immersed in liquid at least while in operation.

It is another object of the present invention to provide chucks of this type which are sealed, as aforementioned, especially, though not exclusively, by providing for the jaws carriers in the form of simple bars which operate plunger-like in apertures, and preferably simple bores, in the chuck body, with these bars extending beyond the outer periphery of the chuck body to the outside thereof and there having provisions for the firm and accurate, as well as releasable, mount thereon of jaws of any kind, including master or solid, and having within the chuck body releasable operating connections with any conventional jaw actuator or actuators. With this arrangement, all leakage paths into the chuck body previously prevailing by virtue of jaw mount and guidance in the chuck body, are eliminated because the only openings to the interior of the chuck body involved in jaw mount and guidance are the bar-guiding bores in the chuck body, and these are sealed most effectively and lastingly by simple seals applied in these bores for dealing with the bars therein as leakproof plungers which remain leakproof under all, including particularly severe, operating conditions. Further, these barguiding bores may be, and preferably are, not only of relatively large diameter, but also of considerable depth or length over their bar-guiding extent in any jaw position, so that the bars of corresponding dimensions have great strength and such abundant guidance that neither they nor the bores will be subject to any appreciable wear for the longest time and under any, and even the heaviest, jaw loads. Also the bores are preferably arranged as close to the front face of the chuck body as is consistent with adequate thickness and, hence, structural strength of the bore walls thereat, and the work-gripping surfaces of the jaws on the bars may be at least as close to the front face of the chuck body as in previous chucks of this type, so that the overhang of the jaws is at least no more than in previous chucks, and their bellmouthing under load is even less than in previous chucks owing to the abundant circumferential and longitudinal, as well as firm and entirely playless, guidance of the bars in the bores. Moreover, with these most accessible leakage paths along the jaw guides in the chuck body eliminated, other leakage paths to the interior of the chuck body of the present chuck, as well as of prior chucks of this type, may effectively be sealed off by conventional seals applied in obvious manner to these chucks mostly without requiring any changes in structure or design of the jaw-operating parts of any known kind and including those for centering or compensating action of the jaws, so that these chucks will be effectively and lastingly sealed from all surrounding foreign matter, including liquid if they are immersed therein.

It is a further object of the present invention to provide chucks of this type of which master jaws, or solid jaws in the absence of master jaws, which are mounted on the aforementioned bars, have at their inner ends extensions, preferably in the form of sturdy cylindrical posts, which are received plunger-like in radial bores in forward lug extensions on the front face of the chuck body. With this arrangement, the jaws on the bars are not only additionally held for operational movement truly radially of the chuck axis, but bellmouthing of the work-gripping jaws under any load is eliminated for all practical purposes.

Another object of the present invention is to provide chucks of this type which, besides being mechanically sealed from surrounding foreign matter as aforementioned, are still further protected from such foreign matter in the rare event of any one or more of the mechanical seals developing a leak, and particularly a minute and likely undetectible leak, by providing in the chuck body a closed and sealed chamber which is open to any, and preferable all, leakage paths into the chuck which are sealed off mechanically, and charging this chamber with fluid under pressure, preferably compressed air, through a readily accessible nipple on the chuck body and an interposed check valve, for instance. The chamber thus acts as a reservoir for an ample supply of compressed air which ordinarily remains trapped therein and in the sealed-off leakage paths, but forces its way through any, and even a minute, leak in any of the mechanical seals and thereby keeps foreign matter from seeping through such a leak.

Of course, the contained compressed air supply, while safeguarding particularly against a smaller leak in any mechanical seal until detected and then repaired at a convenient time, secures still another and quite important advantage, in that a quick pressure check at any time of the trapped air affords a ready indication of the sealed or even slightest leaking condition of the chuck at that time.

Further objects and advantages will appear to those skilled in the art from the following, considered in conjunction with the accompanying drawings.

In the accompanying drawings, in which certain modes of carrying out the present invention are shown for illustrative purposes:

FIG. 3 is a fragmentary section through a chuck embodying the invention in a modified manner.

Figure 1:
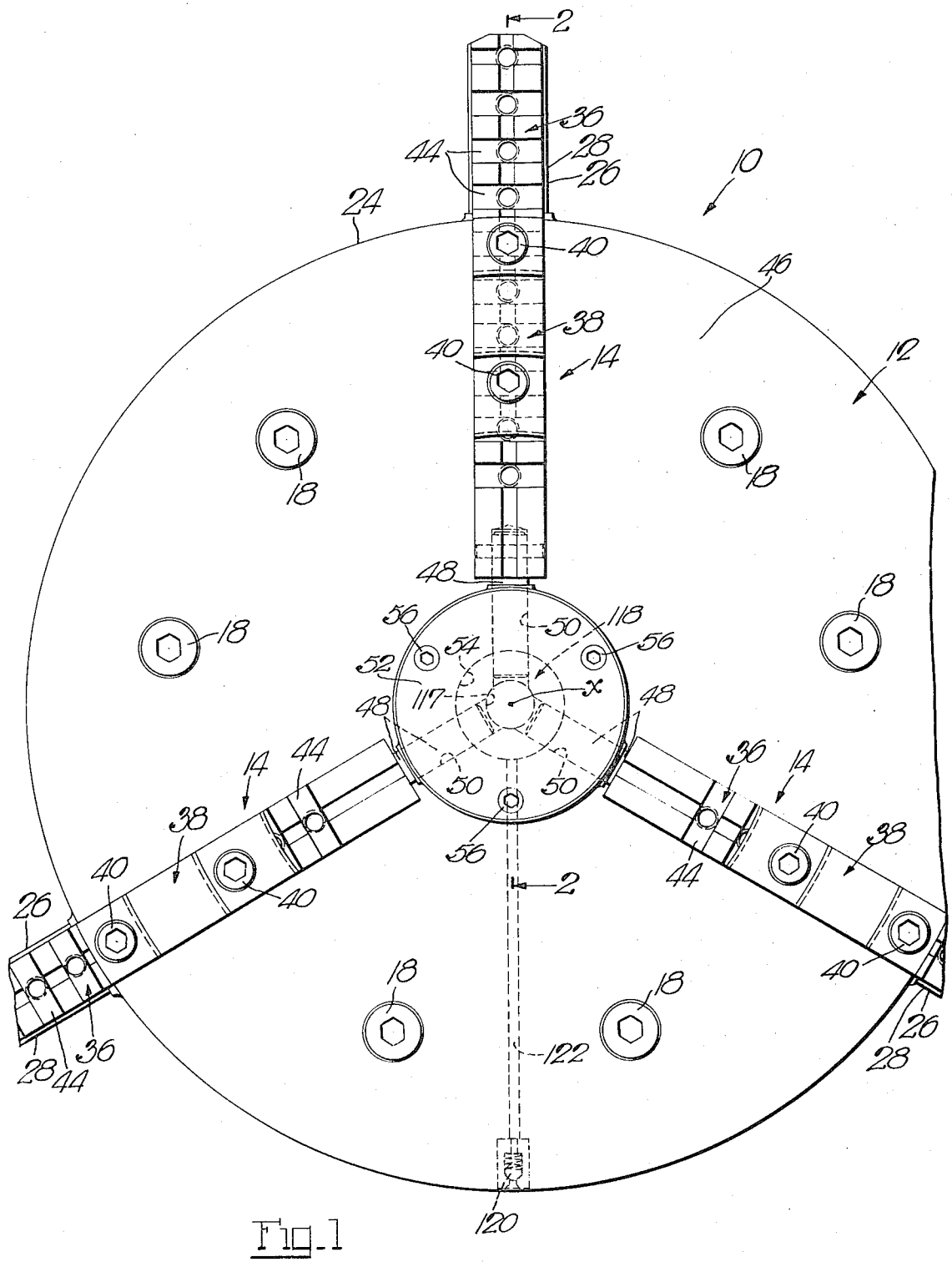
FIG. 1 is a fragment front view of a chuck embodying the invention.
Figure 2:
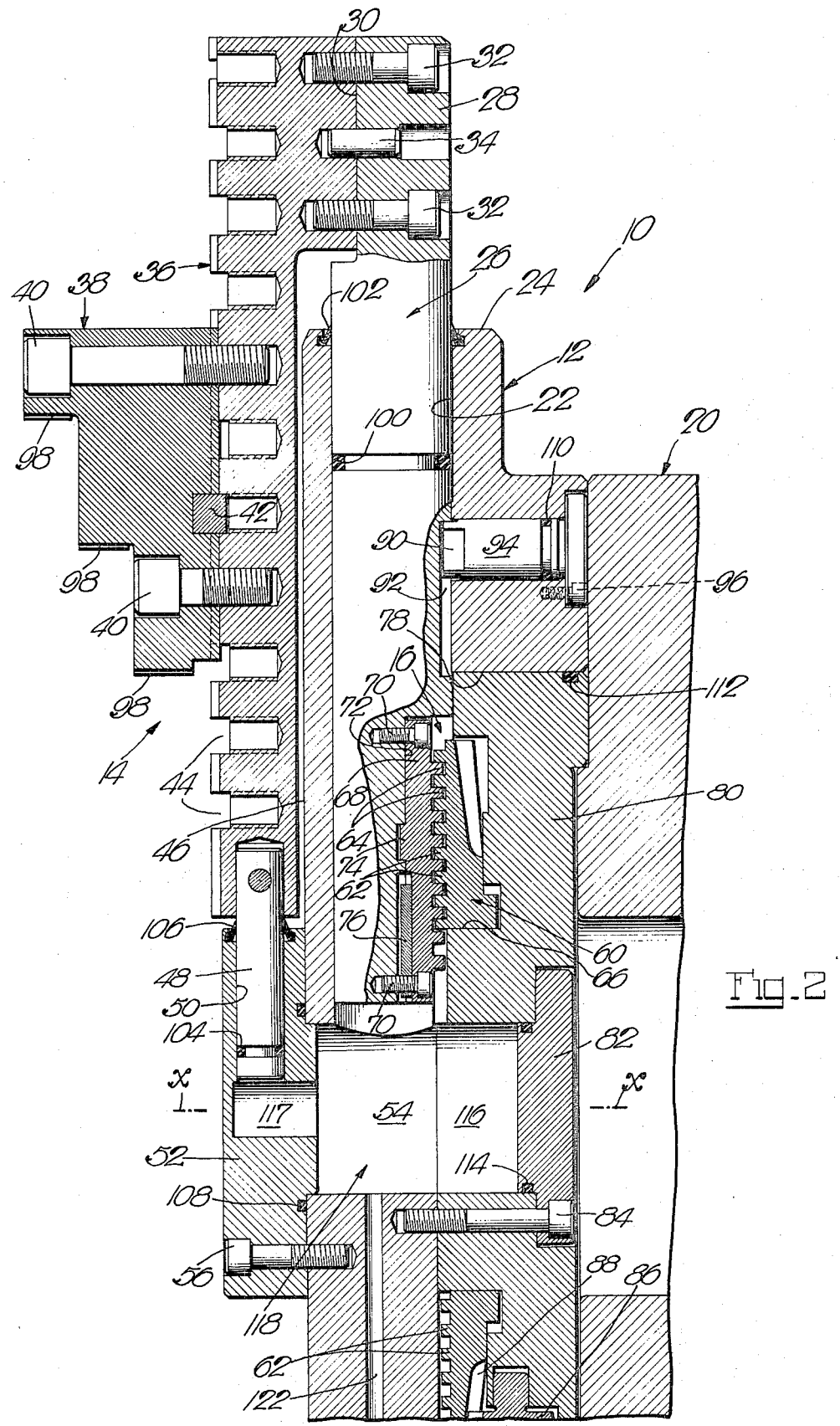
FIG. 2 is an enlarged fragmentary section through the same chuck taken substantially along the line 2—2 of FIG. 1.

Referring to the drawings, and more particularly to FIGS. 1 and 2 thereof, the reference numeral 10 designates a chuck having a body 12 with an axis $x$ which is the chuck axis, a plurality of jaws 14 which are guided in the chuck body 12 for movement to and from work, and jaw-actuating mechanism 16. The chuck is in this instance shown mounted, as by bolts 18, on a power spindle 20 of a lathe or other machine tool.

The jaws 14 are guided in the chuck body 12 for movement, in this instance, radially of, and also perpendicular to, the axis $x$, and the guideways in the chuck body for the jaws are arranged accordingly. In accordance with one aspect of the invention, the guideways for the jaws are in the form of bearing apertures 22 in the chuck body 12 which are open at the outer periphery 24 of the latter, and the jaws are provided with bars 26 which are received with a sliding fit in the respective apertures 22. Preferably and conveniently, the apertures 22 in the chuck body are cylindrical bores which in this instance are equiangularly spaced about the chuck axis $x$ and extend with their axes radially of, and also perpendicular to, the axis $x$, with these bores 22 being of the exemplary number of 3 for a like number of jaws 14, and the bars 26 are correspondingly cylindrical for their slide fit in the bores 22, and they extend beyond the body periphery 24 where they carry the respective jaws. More particularly, each jaw and its guide bar is preferably formed as separate parts, with each bar 26 having in this instance an outer end-length 28 with a flat surface 30 on which the associated jaw is firmly and accurately mounted, as by bolts 32 and a dowel pin 34, for example, and each jaw 14 provides in this instance two component parts, i.e., a master jaw 36 and a work-gripping top jaw 38 thereon, of which the master jaw 36 has a part or portion outside the body periphery for its mount on a guide bar 26. Each master jaw 36 is in this instance of serrated type, and the associated top jaw 38 is removably mounted on the master jaw in any of various radial positions thereon by bolts 40 and a key 42 which is received in any of a number of transverse grooves 44 in the master jaw. Each master jaw 36 extends longitudinally radially of the chuck axis $x$, and extends over the greater part of its length in front of and spaced from, the front face 46 of the chuck body. Preferably, each master jaw 36 has at its inner end a longitudinal extension in the preferred form of a cylindrical post 48 which is received plunger-like in a bore 50 in a forward lug extension 52 on the front face 46 of the chuck body. In this instance, the lug extension 52 on the chuck body is a separate disc-like part which serves as a front cover for a central aperture 54 in the chuck body and is mounted on the latter as by screws 56, with this part 52 providing the bores 50 for the posts 48 on all master jaws 36.

The chuck is in this instance scroll-operated, and to this end the jaw-actuating mechanism provides a scroll disc 60 having teeth 62 which are in mesh with teeth 64 on the respective bars 26. The scroll disc 60 is suitably journalled in the chuck body 12 as at 66, and the teeth 64 on each bar 26 are in this instance provided on a rack-like bar 68 which by screws 70 is mounted on a machined flat surface 72 of the bar 26, with the bar 68 being preferably also keyed to the bar 26 as at 74 and 76. For installation of the scroll disc 60 in, and also for its removal from, the chuck body 12, the latter is provided with a preferably cylindrical rear aperture 78 which is normally closed by a ring member 80 that is suitably bolted to the chuck body, and in this instance also provides the bearing surface 66 for the scroll disc 60. The ring member 80 extends the body aperture 54 rearwardly where it is closed by a rear cover 82 which at 84 is bolted to the ring member 80 as well as to the chuck body 12. The scroll disc 60 is in this instance manually operated by a pinion 86 which is in mesh with the usual gear teeth 88 in the rear face of the scroll disc, with this pinion 86 having a shank (not shown) with a socket end accessible with a suitable wrench at the outer periphery of the chuck body.

To prevent any operational twisting of the cylindrical jaw bars 26 in their bores 22 in the chuck body, each bar 26 is splined to the chuck body, as by a key 90 which is received in a longitudinal groove 92 in the bar 26, and is in this instance formed at the end of a stud 94 which at 96 is secured in the chuck body.

For gripping and releasing work, the pinion 86 and scroll disc 60 are operated by a wrench in this instance. With the present top jaws 38 having inner work-gripping surfaces 98, the jaws 14 will grip and release work on their inward and outward movement, respectively. Alternatively, on substituting for the present top jaws 38 other top jaws with outer work-gripping surfaces, the latter jaws will grip and release work on their outward and inward movement, respectively.

By virtue of the provision of the jaws with guide bars and their reception in cylindrical bores in the chuck body, and also by virtue of the additional guidance of the jaws at their inner ends, the present chuck has several of the aforementioned, and also other, structural and functional features. Among these features of the chuck is its fairly closed construction as described so far, which already affords a measure of protection of the operating chuck parts from harmful dust and like foreign matter surrounding the chuck. However, the operating parts of the present chuck may be sealed, in an exceedingly simple and inexpensive manner and most effectively and lastingly, from any surrounding foreign matter, including dust or even liquid if the chuck is immersed therein. To this end, the potentially most accessible leakage paths for foreign matter to the operating chuck parts along the bores 22 in the chuck body and guided jaw bars 26 therein, and along the bores 50 in the front cover disc 52 and guided jaw posts 48 therein, are effectively closed by simple seals. Thus, in the present instance, each jaw bar 26 carries a sealing ring 100 which is in lasting sealing engagement with the wall of the respective body bore 22, and each body bore 22 is near its outer end provided with a further ring seal 102 of known wiper type, while the post 48 on the inner end of each jaw carries a sealing ring 104 which is in lasting sealing engagement with the wall of the respective bore 50 in the front cover disc 52, and each of these bores 50 is near its outer end provided with a further ring seal 106 of similar wiper type. The operating parts of the chuck may be and preferably are, still further sealed from outside foreign matter of any kind, including dust and even liquid, so that all conceivable leakage paths to these operating parts are effectively and lastingly closed. Thus, the front cover disc 52 is in its mounting surface provided in this instance with a sealing ring 108 which bears against the front face 46 of the chuck body, and each of the key studs 94 carries a sealing ring 110, while the ring member 80 carries a sealing ring 112 which bears against the wall of the rear aperture 78 in the chuck body, and the rear cover 82 carries a sealing ring 114 which bears against the ring member 80. Further, the referred-to shank (not shown) of the pinion 86 is also effectively sealed in the chuck body so that no foreign matter may leak to the pinion 86 and, hence, into the interior of the chuck body.

With all the leakage paths to the operating parts of the chuck sealed as described, it is also feasible to keep the various seals subjected to fluid under pressure, and preferably compressed air, which stands ready to sweep away any foreign matter that may tend to seep past any of these seals from any cause, such as a developing breakdown of, or even a minute leak in, any seal, for example. To this end, the central aperture 54 in the chuck body 12 and its continuations 116 and 117 into the ring member 80 and front cover disc 52 define a reservoir 118 for a supply of compressed air, with this compressed air having access to all the seals through whatever internal leakage paths lead thereto. The reservoir 118 is in this instance charged with compressed air through a suitable check valve 120 in the chuck body and an orifice 122 which leads to the reservoir.

The compressed air thus trapped in the chuck body not only contributes directly to keeping foreign matter from the operating chuck parts even if one or more of the seals should on rare occasion develop a weakness, but affords ready indication of any leak, and particularly of any minute and otherwise undetectable or barely detectable leak among any of the seals, by a simple pressure check of the trapped air at the check valve 120, so that any indicated seal defect may be corrected in good time.

It will be noted that in this instance the inner ends of the jaw bars 26 and jaw posts 48 are exposed plunger-like to the compressed air in the reservoir 118, wherefore this compressed air exerts on these bars 26 and posts 48 an outward force which tends to open the jaws. However, even at considerable pressure of the trapped air in the reservoir 118, this outward force on the bars 26 and posts 48 is at the most negligible, since it hardly requires any more than the usual effort in closing the jaws on work, neither will it weaken the applied safe jaw grip on work, owing to the usual self-locking nature of the scroll disc 60.

The invention pertaining to the advantageous jaw support and guidance in the chuck body by means of bars in cylindrical bores in the chuck body, and also pertaining to effective sealing of the operating chuck parts from foreign matter, is applicable to all kinds of chucks and is by no means limited to scroll-operated chucks or to work-centering chucks, such as the one described with reference to FIGS. 1 and 2, for example. Thus, FIG. 3 shows a modified chuck 10a which fully embodies the present invention, and is neither scroll-operated nor of work-centering type. This particular chuck 10a, which is plunger-operated and has compensating jaw action, is like the compensating chuck disclosed in the Patent to Swanson, No. Re 24,684, dated Aug. 18, 1959, except for such changes involved in the embodiment of the present invention. Thus, the carrier of each jaw 14a is provided with, and in this instance carried by, a cylindrical bar 26a which is received with a sliding fit in a cylindrical bore 22a in the chuck body 12a, with the bar 26a being splined to the chuck body by the key end 90a of a stud 94a. Further, each jaw 14a is provided with an inner post 48a which is received with a sliding fit in a cylindrical bore 50a in a central boss 130 on the front face 132 of the chuck body. Each jaw bar 26a is provided with a transverse groove 134 for reception of a roller-shaped end 136 of one arm 138 of a rocker 140, having another arm 142 with a roller-shaped end 144 which projects into a peripheral groove 146 in a jaw-actuating plunger 148. For compensating action of the jaws 14a, the rockers 140 for the several jaws are at 150 pivotally mounted in a cage 152 which is received in a rear recess 154 in the chuck body 12a and retained therein by a rear body member 156 which at 158 is bolted to the chuck body 12a. The cage 152 has in the recess 154 freedom of limited floating motion in a plane $p$ normal to the chuck axis $xa$ for cooperation between the rocker ends 136 and transverse grooves 134 in the jaw bars 26a to the end of having the jaws 14a perform in compensating fashion in a manner more fully explained in the aforementioned Swanson Pat. No. Re 24,684. The plunger 148 is guided for reciprocation in the chuck body, and more particularly in a cylindrical sleeve 160 in the rear body member 156, and has a rear shank 162 which in this instance is at 164 connected with a power-operated draw bar. The chuck is mounted on, and in this instance bolted at 166 to, a power spindle 168 of a lathe or other machine tool. Owing to the exemplary compensating action of the jaws 14a, the chuck body 12a is provided in its front with a fixed work center 170.

The present chuck 10a thus has all the advantages of jaw support and guidance by means of solid bars in bores in the chuck body, and also has the additional advantages of further jaw support and guidance by means of inner posts on the jaws and their reception in additional bores in the chuck body. Further, with the chuck 10a described so far being already fairly closed in its construction, the same affords some measure of operation of its operating parts from surrounding foreign matter, such as dust, for example. However, the present chuck may internally be completely sealed from all foreign matter, including even liquid if the chuck is immersed therein, as easily as the chuck of FIGS. 1 and 2 is sealed. Thus, each jaw bar 26a may carry a sealing ring 172 which bears against the wall of the respective bore 22a in the chuck body, and each jaw post 48 may carry at least one sealing ring 174 which bears against the wall of the respective bore 50a in the front boss 130 of the chuck body, while further sealing rings 176 and 178 may be applied to the chuck body 12a and to each of the key studs 94a to seal off all remaining leakage paths to the interior of the chuck.

Recourse may also be had to trapped fluid under pressure, and particularly compressed air, in the interior of the chuck, not only to further safeguard the chuck from any surrounding foreign matter, but also to afford ready indication of any developing weakness of, including even a minute and virtually undetectable leak in, any of the seals. To this end, the closed rear recess 154 in the chuck body 12a may serve as a convenient reservoir 180 for a supply of compressed air which may be introduced through a suitable check valve 120a and an orifice 122a which leads to the reservoir 180, with the check valve 120a also serving for taking thereat a check of the pressure of the trapped air in the reservoir 180.

While in the chuck of FIGS. 1 and 2 the trapped air in the interior of the chuck exerts an outward force on the jaw bars and also on the jaw posts, this is prevented in the present chuck 10a. Thus, the inner ends 182 of the body bores 50a for the jaw posts 48a are in this instance closed to the reservoir 180, and the inner ends 184 of the body bores 22a for the jaw bars 26a are also closed to the reservoir, with compressed air in the reservoir 180 having access to whatever clearance there is between the jaw bars 26a and the walls of the respective body bores 22a through apertures 186 in the chuck body through which the rockers 140 extend into operative connection with the respective jaw bars 26a. To avoid any possible leakage to the inner ends 184 of the body bores 22a of compressed air thus admitted to these body bores, the jaw bars carry further sealing rings 188 near their inner ends. To prevent air from becoming trapped in the inner ends 182 and 184 of the respective body bores 50a and 22a, these inner bore ends 182 and 184 are preferably vented, as at 190 and 192, to the outside of the chuck body where these vents are least subjected to foreign matter, including dust, with these vents being, moreover, kept fairly free of any foreign matter by pumping action of the jaw posts 48a and jaw bars 26a in closing the jaws.

To also cancel out any effect of the compressed air in the reservoir 180 on the jaw-actuating plunger 148, the forward end 194 of the latter is received with a sliding fit in a cylindrical recess 196 in the chuck body, with this plunger end 194 carrying a sealing ring 198, and the body recess 196 being preferably vented as at 200.

What is claimed is:

1. A chuck having a chuck body with an axis, an outer periphery and a front face, and provided with angularly spaced first cylindrical bores in said periphery longitudinally extending radially of and substantially normal to said axis and being spaced rearwardly from said front face; a plurality of cylindrical bars received in said bores, respectively, with a sliding fit for guided longitudinal movement therein, with said bars extending with their outer ends outside said body periphery; a plurality of jaws; jaw carriers in front of said body face; parts outside said body connecting said carriers with said outer bar ends, respectively, for movement of said carriers with the respective bars, with said carriers being movable in front of said face, and extending within the peripheral confines, of said body; and an actuator in said chuck body operatively connected with said bars and operable to move the latter in the respective bores longitudinally thereof.

2. A chuck as in claim 1, in which said jaw carriers have at their inner ends cylindrical post extensions, and said chuck body has at its front face forward lug formations with other cylindrical bores in which said post extensions are received with a sliding fit for their guidance parallel to the guided bars of the respective jaws.

3. A chuck as in claim 2, which further provides seals in said bores to keep outside foreign matter from seeping along said bars and post extensions into the respective bores.

4. A chuck as in claim 1 in which said chuck body has a sealed inner chamber in which said operating connection between said actuator and bars is contained, and which is in communication with said bores, there are provided first seals in said bores near said outer body periphery to keep outside foreign matter from seeping along said bars into said bores and chamber, said chamber holds fluid above atmospheric pressure for ejecting from any of said bores foreign matter tending to seep therein past said seals therein, said bores have inner ends closed to said chamber, and there are further provided in said bores near said inner ends thereof second seals which cooperate with the respective bars in any operational position therein to seal said inner ends of said bores from the portions thereof intermediate said first and second seals therein, and vent passages in said chuck body from said inner bore ends to the outside of the chuck body, with said chamber being in communication with said portions only of said bores.

5. A chuck as in claim 3, in which said chuck body has a sealed inner chamber in which said operating connection between said actuator and bars is contained, and which is in communication with said bores, and said chamber holds fluid above atmospheric pressure for ejecting from any of said bores foreign matter tending to seep thereinto past the seal therein.

6. A chuck as in claim 2, in which the jaws comprise said jaw carriers in the form of master jaws, and top jaws removably mounted on the respective master jaws.

* * * * *